(12) United States Patent
Oda et al.

(10) Patent No.: US 9,298,716 B2
(45) Date of Patent: Mar. 29, 2016

(54) INFORMATION PROCESSING APPARATUS, METHOD FOR CONTROLLING THE SAME, AND STORAGE MEDIUM STORING PROGRAM FOR DISPLAYING A TAG ADDED TO A CONTENT FILE

(71) Applicant: CANON KABUSHIKI KAISHA, Tokyo (JP)

(72) Inventors: Hirotaka Oda, Tokyo (JP); Atsushi Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 13/742,269

(22) Filed: Jan. 15, 2013

(65) Prior Publication Data

US 2013/0191387 A1    Jul. 25, 2013

(51) Int. Cl.
G06F 17/30    (2006.01)

(52) U.S. Cl.
CPC .... G06F 17/30115 (2013.01); G06F 17/30268 (2013.01)

(58) Field of Classification Search
CPC .......... G06F 3/04842; G06F 17/30056; G06F 17/30268
USPC ........................................................ 707/736
See application file for complete search history.

(56) References Cited

U.S. PATENT DOCUMENTS

| | | | |
|---|---|---|---|
| 6,914,625 B1 * | 7/2005 | Anderson et al. ........... 348/222.1 |
| 7,853,704 B2 * | 12/2010 | Sakoh et al. ................. 709/229 |
| 8,504,573 B1 * | 8/2013 | Iampietro et al. ............. 707/737 |
| 8,738,630 B2 * | 5/2014 | Lin ................................ 707/741 |
| 2002/0055955 A1 * | 5/2002 | Lloyd-Jones et al. ........ 707/512 |
| 2008/0275850 A1 * | 11/2008 | Asai ................................. 707/3 |
| 2009/0125560 A1 * | 5/2009 | Munekuni et al. ......... 707/104.1 |
| 2011/0016150 A1 * | 1/2011 | Engstrom et al. ............. 707/778 |
| 2011/0087666 A1 * | 4/2011 | Chou et al. .................... 707/737 |
| 2013/0046878 A1 * | 2/2013 | Fryc et al. ..................... 709/224 |
| 2013/0103723 A1 * | 4/2013 | Hori .............................. 707/803 |
| 2013/0191387 A1 * | 7/2013 | Oda et al. ...................... 707/736 |
| 2015/0046878 A1 * | 2/2015 | Sutou et al. ................... 715/835 |

FOREIGN PATENT DOCUMENTS

| | | | |
|---|---|---|---|
| JP | 2008-085983 A | 4/2008 |
| JP | 2009-140339 A | 6/2009 |
| JP | 2009-277192 A | 11/2009 |
| JP | 2010-237722 A | 10/2010 |

* cited by examiner

*Primary Examiner* — Debbie Le
(74) *Attorney, Agent, or Firm* — Canon USA, Inc., IP Division

(57) ABSTRACT

The present invention is directed to improving user operability by identifiably notifying the user of the current collective addition statuses of tags to a plurality of files which are targets of tag addition or tag deletion, when the tags are collectively added or deleted to/from the plurality of files. An information processing apparatus acquires tag information stored in association with a plurality of content files, and selects a part of the plurality of content files. The information processing apparatus then detects whether the acquired tag information is associated with the selected content files, and displays the tag information in a display mode according to a sufficiency rate at which the piece of the tag information is added to the selected content files.

7 Claims, 14 Drawing Sheets

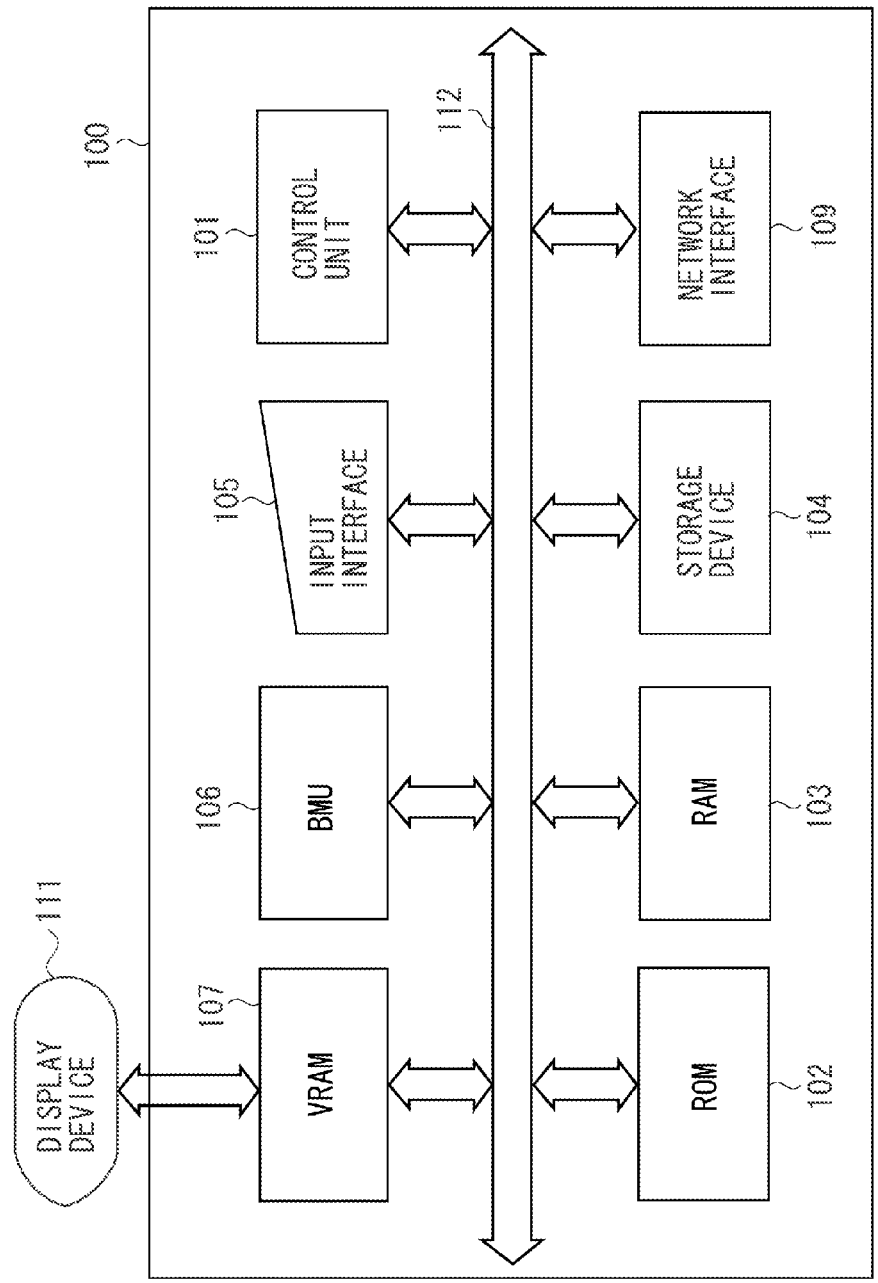

FIG. 2A
200 IMAGE MANAGEMENT TABLE

| IMAGE ID | IMAGE PATH | IMAGE NAME |
|---|---|---|
| img001 | C:¥Users¥Documents ¥Photo¥ · · · | IMAGE_A |
| img002 | C:¥Users¥Documents ¥Photo¥ · · · | IMAGE_B |
| img003 | C:¥Users¥Documents ¥Photo¥ · · · | IMAGE_C |
| img004 | C:¥Users¥Documents ¥Photo¥ · · · | IMAGE_D |
| · · · | · · · | · · · |

FIG. 2B
230 TAG MANAGEMENT TABLE

| TAG ID | TAG NAME |
|---|---|
| tag001 | Ichiro |
| tag002 | Trip |
| tag003 | Kyoto |
| tag004 | Hana |
| · · · | · · · |

FIG. 2C
250 TAG ADDITION TABLE

| TAG ID | IMAGE ID |
|---|---|
| tag001 | img001 |
| tag001 | img002 |
| tag002 | img003 |
| tag003 | img003 |
| · · · | · · · |

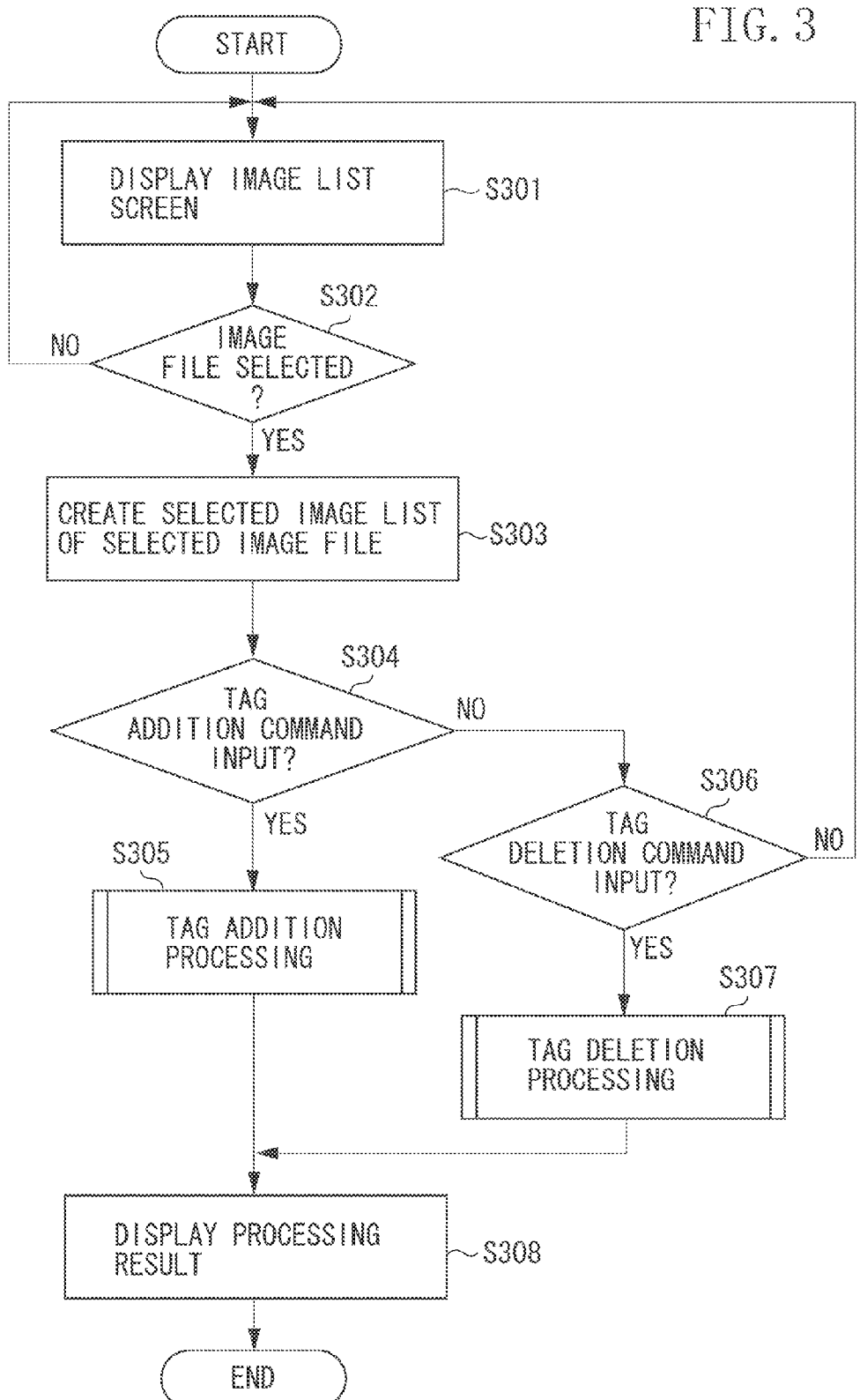

INFORMATION PROCESSING APPARATUS, METHOD FOR CONTROLLING THE SAME, AND STORAGE MEDIUM STORING PROGRAM FOR DISPLAYING A TAG ADDED TO A CONTENT FILE

BACKGROUND OF THE INVENTION

1. Field of the Invention

The present invention relates to a technique for displaying a tag added to a content file.

2. Description of the Related Art

Arbitrary attribute information (i.e., a tag) has conventionally been added to image data to improve searchability of the image data (See Japanese Patent Application Laid-Open No. 2010-237722). According to Japanese Patent Application Laid-Open No. 2010-237722, attribute information is displayed in descending order of past usage frequency. A user can select attribute information to add to image data from the displayed attribute information pieces.

A user may sometimes want to select a plurality of files and collectively add or delete a tag to/from the files. In such a case, tags currently added to the selected files may be different.

However, according to Japanese Patent Application Laid-Open No. 2010-237722, only the past use frequency of attribute information will be presented. Thus, it is inconvenient for the user since the user cannot collectively grasp the statuses of tags currently added to a plurality of files to which or from which a tag is added or deleted (i.e., targets of tag addition or tag deletion).

In other words, if the user can collectively comprehend the addition statuses of tags to the plurality of files which are targets of tag addition or tag deletion in advance, the user can easily select a tag by reference to such information.

The present invention is directed to improving user operability by identifiably notifying the user of the current collective addition statuses of tags to a plurality of files which are targets of tag addition or tag deletion, when the tags are collectively added or deleted to/from the plurality of files.

SUMMARY OF THE INVENTION

According to an aspect of the present invention, an information processing apparatus includes an acquisition unit configured to acquire tag information stored in association with a plurality of content files, a selection unit configured to select a part of the plurality of content files, a detection unit configured to detect whether the acquired tag information is associated with the selected content files, a calculation unit configured to calculate a sufficiency rate at which the tag information is added to the selected content files based on a result of the detection, and a display control unit configured to perform control to display the acquired tag information in a display mode corresponding to the calculated sufficiency rate, wherein the information processing apparatus comprises a processor executing a program stored in a memory to implement at least a part of a function of at least one of the units.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a configuration of an information processing apparatus according to an exemplary embodiment of the present invention.

FIGS. 2A to 2C are tables for managing various types of information according to the exemplary embodiment of the present invention.

FIG. 3 is a flowchart illustrating an operation of the information processing apparatus according to the exemplary embodiment of the present invention.

DESCRIPTION OF THE EMBODIMENTS

Figure 4:
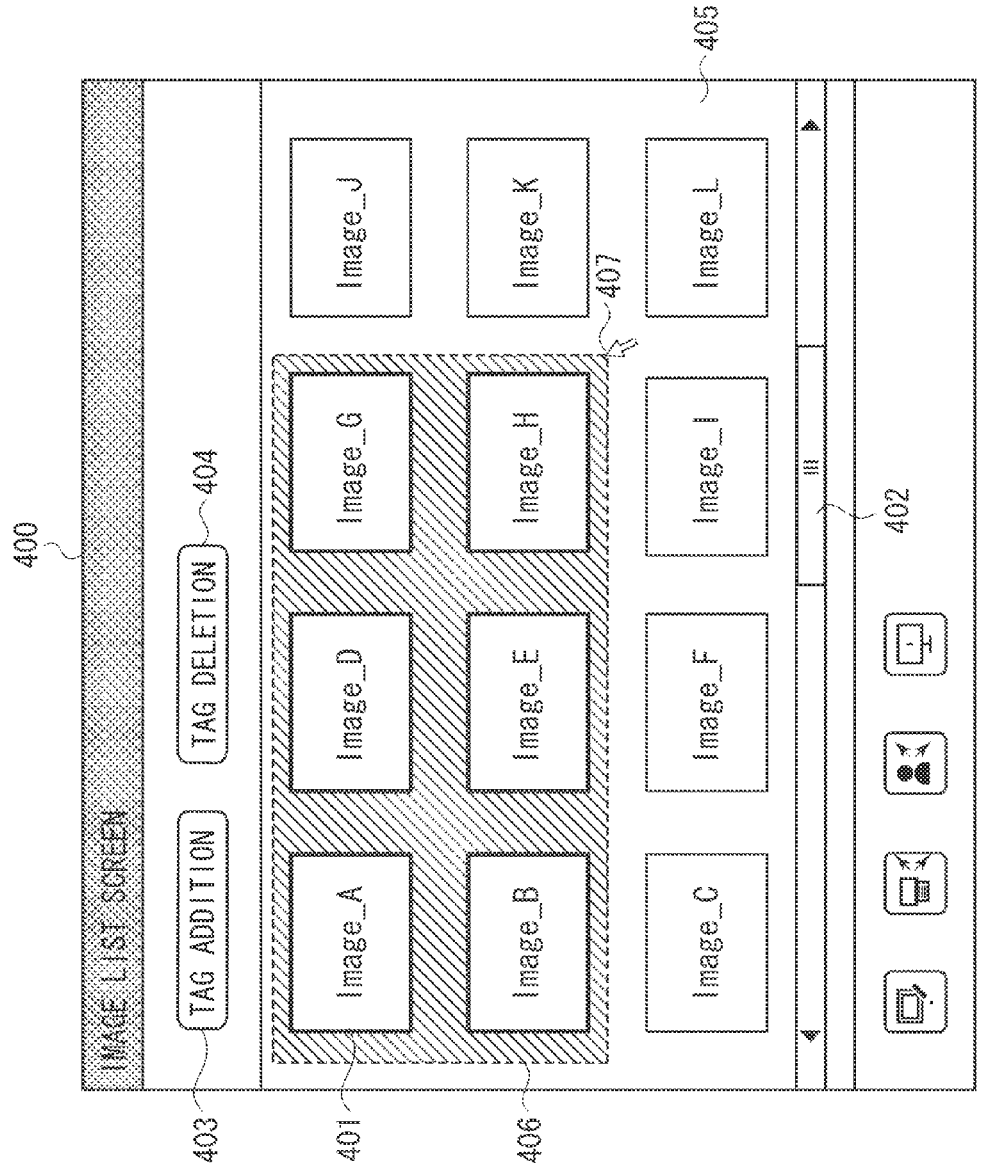
FIG. 4 is an example of an image list screen according to the exemplary embodiment of the present invention.

Various exemplary embodiments, features, and aspects of the invention will be described in detail below with reference to the drawings.

A configuration of a computer apparatus constituting an information processing apparatus according to the present exemplary embodiment will be described with reference to a block diagram illustrated in FIG. 1. The information processing apparatus may be implemented by a single computer apparatus, or may be implemented by distributing functions to a plurality of computer apparatuses according to need. If the information processing apparatus includes a plurality of computer apparatuses, the computer apparatuses are communicably connected to each other by a local area network (LAN) or the like.

In FIG. 1, a control unit 101 controls the entire information processing apparatus 100. An example of the control unit 101 is a central processing unit (CPU). A read only memory (ROM) 102 stores programs and parameters that need not be changed. A random access memory (RAM) 103 temporarily stores programs and data supplied from an external device. A storage device 104 may include a hard disk, a memory card, or the like that is fixedly installed in the information processing apparatus 100. The storage device 104 stores programs such as an operating system (OS). An input interface 105 is connected to an input device that receives a user operation and inputs data. Examples of the input device include a pointing device, a keyboard, and the like.

A bit move unit (BMU) 106 controls data transfer, for example, between memories (e.g., between a video RAM (VRAM) 107 and another memory) and between a memory and an input/output (I/O) device (e.g., a network interface 109). The VRAM 107 draws an image for displaying content data and/or a graphical user interface (GUI) on a display device 111. Examples of the content data may include a document, a graphic, a picture, and the like. The GUI may include an icon, a message, a menu, and the like. The image generated in the VRAM 107 is transmitted to the display device 111 according to a predetermined specification. The display device 111 then displays the image. The network interface 109 connects to a network line such as the Internet. A system bus 112 communicably connects the units 101 to 109.

The storage device 104 stores tag management application program software (hereinbelow, referred to as a tag management application) according to the present exemplary embodiment, as well as image files and music files.

According to the present exemplary embodiment, the information processing apparatus 100 stores information about a image file stored in the storage device 104 into an image management table. FIG. 2A illustrates an example of an image management table 200. The image management table 200 includes image identification (ID) 201 for uniquely identifying an image file, an image file path 202 for indicating a storage location of the image file, and an image name 203 for indicating the name of the image file.

An operation of the information processing apparatus 100 according to the present exemplary embodiment will be described with reference to a flowchart in FIG. 3. The following operation is implemented by the control unit 101 of the information processing apparatus 100 reading and activating the OS and the tag management application from the storage device 104, and controlling the units according to the same.

In step S301, the control unit 101 activates the tag management application, reads an image file stored in a predetermined storage area of the storage device 104, and displays the image file on an image list screen of the tag management application. An image file stored in a predetermined storage area refers to, for example, an image file that is stored in the storage device 104 in association with a folder selected by a user.

FIG. 4 illustrates an example of an image list screen 400. The image list screen 400 displays image files 401 belonging to a predetermined folder stored in the storage device 104 on an image display area 405 as arranged in order based on attribute information pieces of the image files 401. The image display area 405 has an upper limit in size. If the image display area 405 is not able to display all the image files 401 belonging to the predetermined folder stored in the storage device 104, a scroll bar 402 is also displayed. The control unit 101 changes image files to be displayed on the image display area 405 in response to a user's operation for moving the scroll bar 402.

In step S302, in response to a user's operation for dragging a pointer 407 over the image display area 405 to specify a range 406, the control unit 101 detects that the image files 401 displayed in the dragged range 406 are selected. As illustrated in FIG. 4, the dragged range 406 is highlighted, for example, by hatching or the like. The selected image files 401 are also highlighted, for example, by thick frames or the like. FIG. 4 illustrates that image files Image_A, Image_B, Image_D, Image_E, Image_G, and Image_H are selected.

If it is detected that the image files 401 are selected (YES in step S302), then in step S303, the control unit 101 creates a selected image list including the image IDs of the selected image files 401.

In step S304, the control unit 101 determines whether a tag addition command is input with respect to the selected image files 401. More specifically, if the control unit 101 detects that a tag addition button 403 illustrated in FIG. 4 is pressed by a user operation, the control unit 101 determines that the tag addition command is input. If the tag addition command is input (YES in step S304), then in step S305, the control unit 101 performs tag addition processing to be described below.

On the other hand, if the tag addition command is not input (NO in step S304), then in step S306, the control unit 101 determines whether a tag deletion command is input. More specifically, if the control unit 101 detects that a tag deletion button 404 illustrated in FIG. 4 is pressed by a user operation, the control unit 101 determines that the tag deletion command is input. If the tag deletion command is input (YES in step S306), then in step S307, the control unit 101 performs tag deletion processing to be described below.

In step S308, the control unit 101 displays a result of the tag addition processing in step S305 or a result of the tag deletion processing in step S307 on the display device 111.

Figure 5:
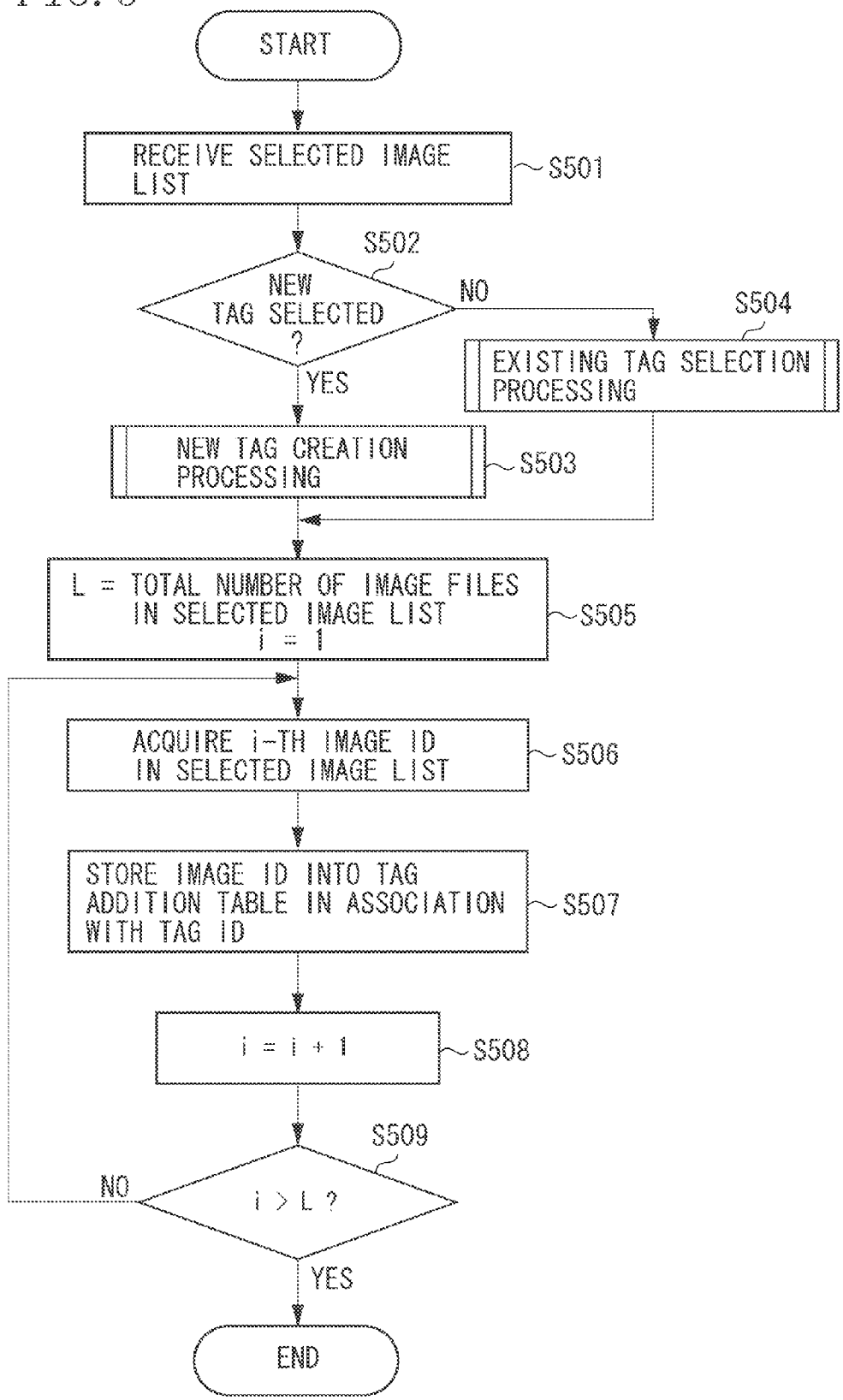
FIG. 5 is a flowchart illustrating an operation of the information processing apparatus according to the exemplary embodiment of the present invention.

The tag addition processing in step S305 will be described with reference to a flowchart in FIG. 5.

In step S501, the control unit 101 receives the selected image list created in step S303.

Figure 6A:
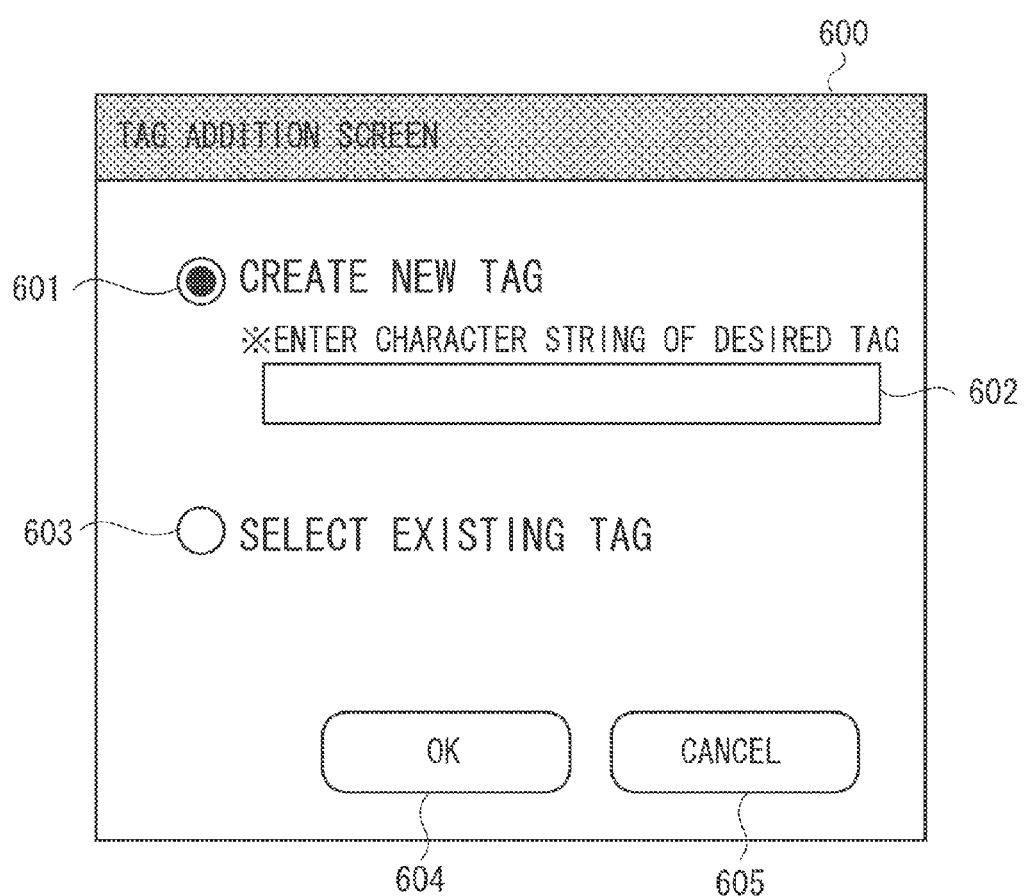
FIGS. 6A and 6B are examples of a tag addition screen according to the exemplary embodiment of the present invention

In step S502, the control unit 101 determines which is selected as a tag to be added to the selected image files, a new tag or an existing tag. Here, the control unit 101 displays a tag addition screen 600 such as illustrated in FIG. 6A on the display device 111. The tag addition screen 600 includes radio buttons 601 and 603 for selecting either one of a "new tag" and an "existing tag." If the control unit 101 detects that the radio button 601 for a "new tag" is pressed by a user operation, the control unit 101 determines that a "new tag" is selected. Whereas, if the control unit 101 detects that the radio button 603 for an "existing tag" is pressed, the control unit 101 determines that an "existing tag" is selected.

If a "new tag" is selected (YES in step S502), then in step S503, the control unit 101 performs new tag creation processing to be described below. On the other hand, if an "existing tag" is selected (NO in step S502), then in step S504, the control unit 101 performs existing tag selection processing to be described below.

In step S505, the control unit 101 substitutes the total number of the image files 401 included in the selected image list into a variable L, and substitutes one into a variable i for initialization. In step S506, the control unit 101 acquires the i-th image ID in the selected image list. In step S507, the control unit 101 stores the image ID into a tag addition table 250 in association with a tag ID of the new tag acquired in step S503 or a tag ID of the existing tag acquired in step S504.

FIG. 2C illustrates an example of the tag addition table 250. The tag addition table 250 includes a tag ID 251 for uniquely identifying a tag, and an image ID 252 for uniquely identifying an image file 401.

In step S508, the control unit 101 adds one to the variable i. In step S509, the control unit 101 compares the variable i with the variable L to determine whether the variable i is greater than the variable L. If the variable i is smaller than or equal to the variable L (NO in step S509), the control unit 101 performs the processing in step S506. On the other hand, if the variable i is greater than the variable L (YES in step S509), the control unit 101 ends the present processing since the tag has been added to all the image files 401 included in the selected image list.

Figure 7:
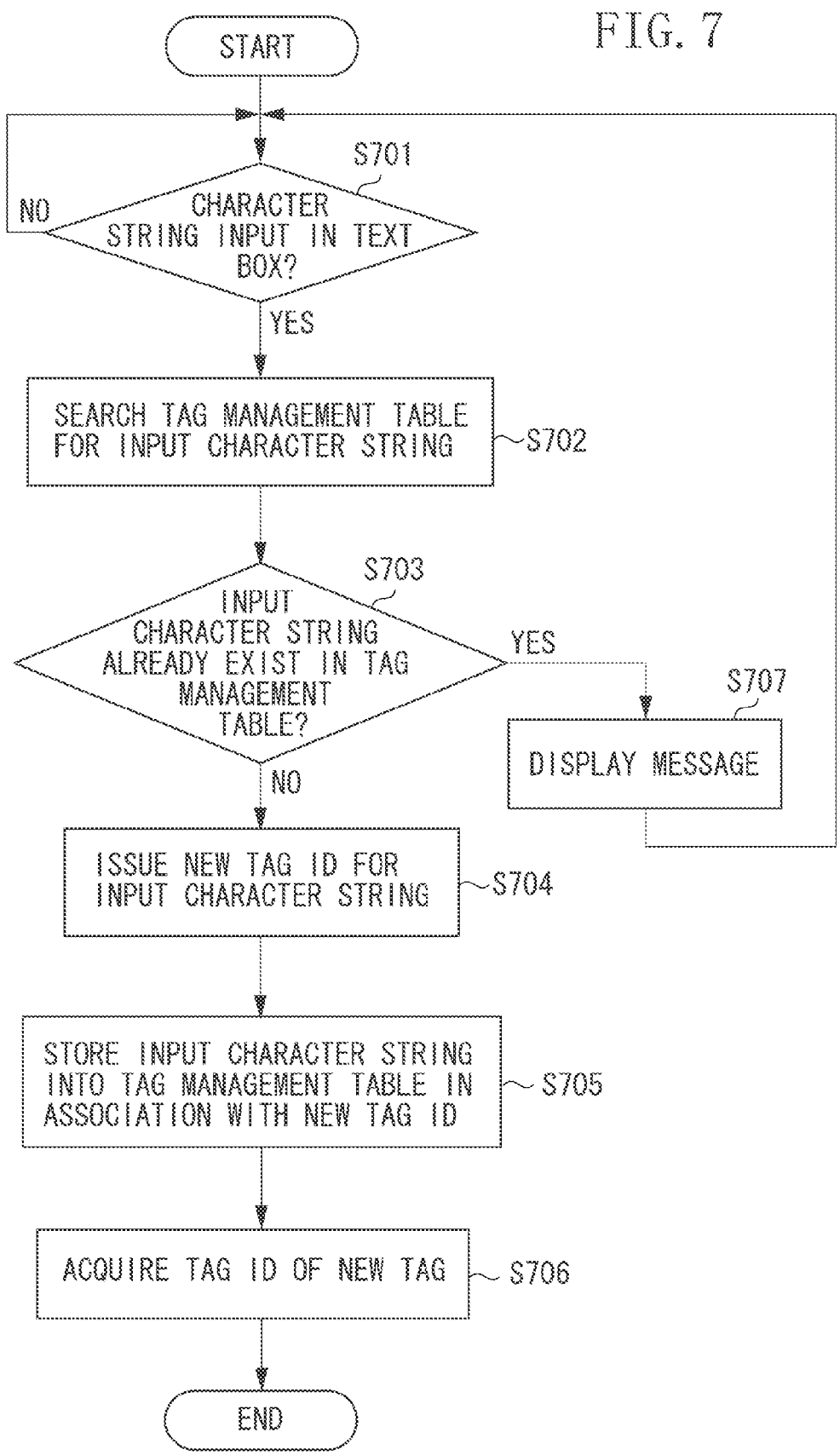
FIG. 7 is a flowchart illustrating an operation of the information processing apparatus according to the exemplary embodiment of the present invention.

The new tag creation processing in step S503 will be described with reference to a flowchart in FIG. 7.

In step S701, the control unit 101 detects whether a character string is input as a new tag. More specifically, if the control unit 101 detects that the radio button 601 for a "new tag" is pressed on the tag addition screen 600, the control unit 101 determines that a "new tag" is selected. The control unit 101 then displays a text box 602 in an enterable state on the tag addition screen 600. If the control unit 101 detects that a character string is entered into the text box 602 and an OK button 604 is pressed by a user operation, the control unit 101 detects that a character string is input. According to the present exemplary embodiment, a tag refers to information that a user can arbitrary set, such as a classification related to contents of an image file 401.

In step S702, the control unit 101 searches a tag management table 230 for the input character string. In step S703, the control unit 101 determines whether the input character string is retrieved from the tag management table, i.e., whether the input character string already exists in the tag management table 230.

If the input character string already exists in the tag management table 230 (YES in step S703), then in step S707, the control unit 101 displays a message for prompting the user to input a different character string, and returns the processing to step S701.

On the other hand, if the input character string does not exist in the tag management table 230 (NO in step S703), then in step S704, the control unit 101 issues a new tag ID for the input character string. In step S705, the control unit 101 stores the input character string into the tag management table 230 in association with the new tag ID.

In step S706, the control unit 101 acquires the new tag ID as the tag ID of the tag to be added to the selected image files 401.

FIG. 2B illustrates an example of the tag management table 230. The tag management table 230 stores tag information including a tag ID 231 for uniquely identifying a tag and a tag name 232 for indicating a name of a tag. The character string input in step S701 is stored into the tag name 232 field, and the new tag ID issued in step S704 is stored into the tag ID 231 field.

Figure 8:
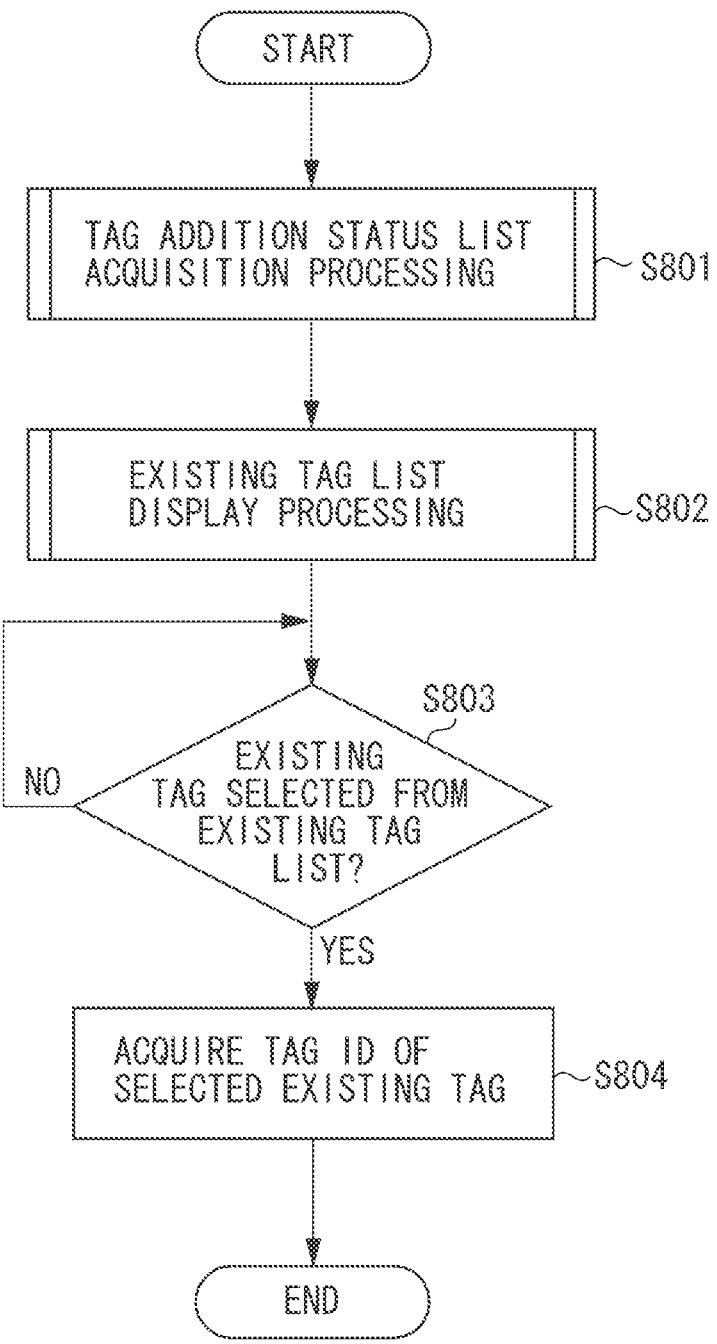
FIG. 8 is a flowchart illustrating an operation of the information processing apparatus according to the exemplary embodiment of the present invention.

The existing tag selection processing in step S504 will be described with reference to a flowchart in FIG. 8.

In step S801, the control unit 101 performs tag addition status list acquisition processing. The tag addition status list acquisition processing in step S801 will be described with reference to a flowchart in FIG. 9.

In step S901, the control unit 101 acquires all tag IDs from the tag management table 230, and newly creates a tag addition status list including these acquired tag IDs. In step S901, the control unit 101 also initializes the numbers of images with the respective tag IDs to zero.

In step S902, the control unit 101 substitutes the number of the tag IDs included in the tag addition status list into a variable M, and substitutes one into a variable i for initialization. In step S903, the control unit 101 substitutes the number of the image files 401 included in the selected image list received in step S501 into a variable L, and substitutes 1 into a variable j for initialization.

In step S904, the control unit 101 searches the tag addition table 250 for a combination of the i-th tag ID of the tag addition status list and the j-th image ID of the selected image list.

In step S905, the control unit 101 determines whether the combination of the i-th tag ID of the tag addition status list and the j-th image ID of the selected image list is retrieved from the tag addition table 250. In other words, the control unit 101 determines whether the combination of the i-th tag ID of the tag addition status list and the j-th image ID of the selected image list already exists in the tag addition table 250. If such a combination exists (YES in step S905), then in step S906, the control unit 101 adds one to the number of images with the i-th tag ID of the tag addition status list. Whereas, if the combination does not exist (NO in step S905), the control unit 101 skips step S906.

In step S907, the control unit 101 adds one to the variable j. In step S908, the control unit 101 compares the variable j with the variable L to determine whether the variable j is greater than the variable L. If the variable j is smaller than or equal to the variable L (NO in step S908), the control unit 101 performs the processing in step S904. On the other hand, if the variable j is greater than the variable L (YES in step S908), then in step S909, the control unit 101 adds one to the variable i since the addition status of the i-th tag ID is acquired with respect to all the image files 401 included in the selected image list.

In step S910, the control unit 101 compares the variable i with the variable M to determine whether the variable i is greater than the variable M. If the variable i is smaller than or equal to the variable M (NO in step S910), the control unit 101 performs the processing in step S903. On the other hand, if the variable i is greater than the variable M (YES in step S910), then in step S911, the control unit 101 acquires the tag addition status list created and completed as described above since the addition statuses are acquired with respect to all the tag IDs included in the tag addition status list. The tag addition status list acquired here indicates which piece of the tag information has been added to all the selected image files 401, which piece of the tag information has been added to a part of the selected image files 401, and which piece of the tag information has been added to none of the image files 401.

In step S802, the control unit 101 performs existing tag list display processing.

Figure 10:
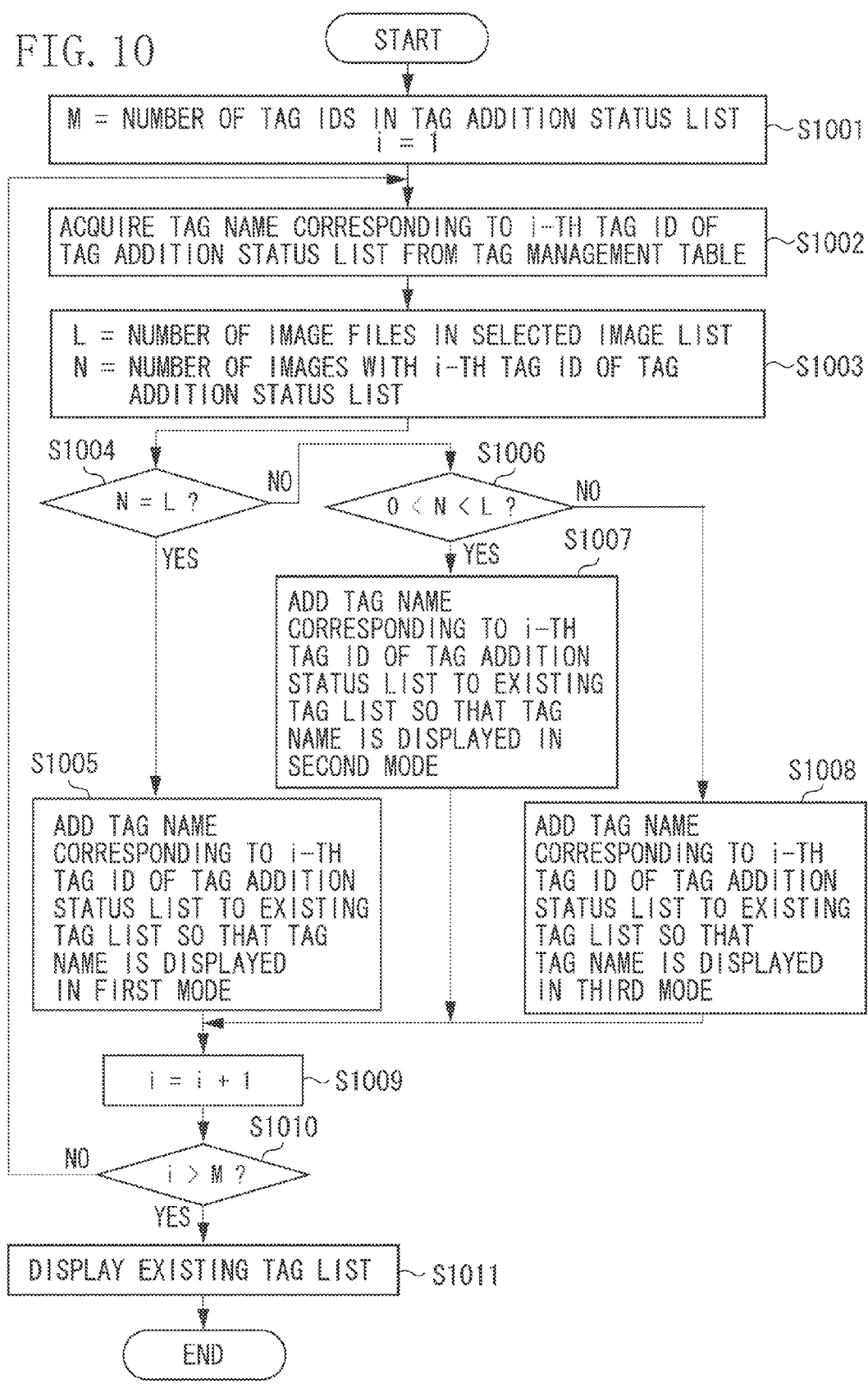
FIG. 10 is a flowchart illustrating an operation of the information processing apparatus according to the exemplary embodiment of the present invention.

The existing tag list display processing in step S802 will be described with reference to a flowchart in FIG. 10.

In step S1001, the control unit 101 substitutes the number of the tag IDs included in the tag addition status list acquired in step S911 into a variable M, and substitutes one into a variable i for initialization.

In step S1002, the control unit 101 acquires a tag name 232 corresponding to the i-th tag ID of the tag addition status list from the tag management table 230.

In step S1003, the control unit 101 substitutes the number of the image files 401 included in the selected image list received in step S501 into a variable L, and substitutes the number of images with the i-th tag ID of the tag addition status list into a variable N.

In step S1004, the control unit 101 compares the variable N with the variable L to determine whether the variable N is equal to the variable L. If the variable N is equal to the variable L (YES in step S1004), then in step S1005, the control unit 101 adds the tag name 232 acquired in step S1002 to an existing tag list along with display control information for display the tag name 232 in a first mode. The first mode indicates that the tag name 232 has been added to "all the selected image files 401", hereinbelow it is referred to as a case (1).

In step S1006, the control unit 101 compares the variable N with the variable L to determine whether the variable N is greater than zero and smaller than the variable L. If the variable N is greater than zero and smaller than the variable L (YES in step S1006), then in step S1007, the control unit 101 adds the tag name 232 acquired in step S1002 to the existing tag list along with display control information for displaying the tag name 232 in a second mode. The second mode indicates that the tag name 232 has been added to "a part of the selected image files 401", hereinbelow it is referred to as a case (2).

If the variable N is not determined to be greater than zero and smaller than the variable L (NO in step S1006), the variable N is zero. Thus, in step S1008, the control unit 101 adds the tag name 232 acquired in step S1002 to the existing tag list along with display control information for displaying the tag name 232 in a third mode. The third mode indicates that the tag name 232 has been added to "none of the selected image files 401 yet", hereinbelow it is referred to as a case (3).

In step S1009, the control unit 101 adds one to the variable i. In step S1010, the control unit 101 compares the variable i with the variable M to determine whether the variable i is greater than the variable M. If the variable i is smaller than or equal to the variable M (NO in step S1010), the control unit 101 performs the processing in step S1002. On the other hand, if the variable i is greater than the variable M (YES in step S1010), the control unit 101 performs the processing in step S1011 since all the tag names 232 included in the tag addition status list have been added to the existing tag list.

In step S1011, the control unit 101 refers to the existing tag list, and displays the tag names 232 on the tag addition screen 600 in display modes corresponding to the display control information added to the respective tag names 232. More specifically, the control unit 101 displays each piece of the tag information in different display modes according to a degree (sufficiency rate) of image files the piece of the tag formation is added to among the selected image files, i.e., what proportion of the selected image files are covered by the piece of the tag information. Possible degrees, as described above, include the case (1) all the selected image files 401, the case (2) a part of the selected image files 401, and the case (3) none of the selected image files 401.

Figure 6B:
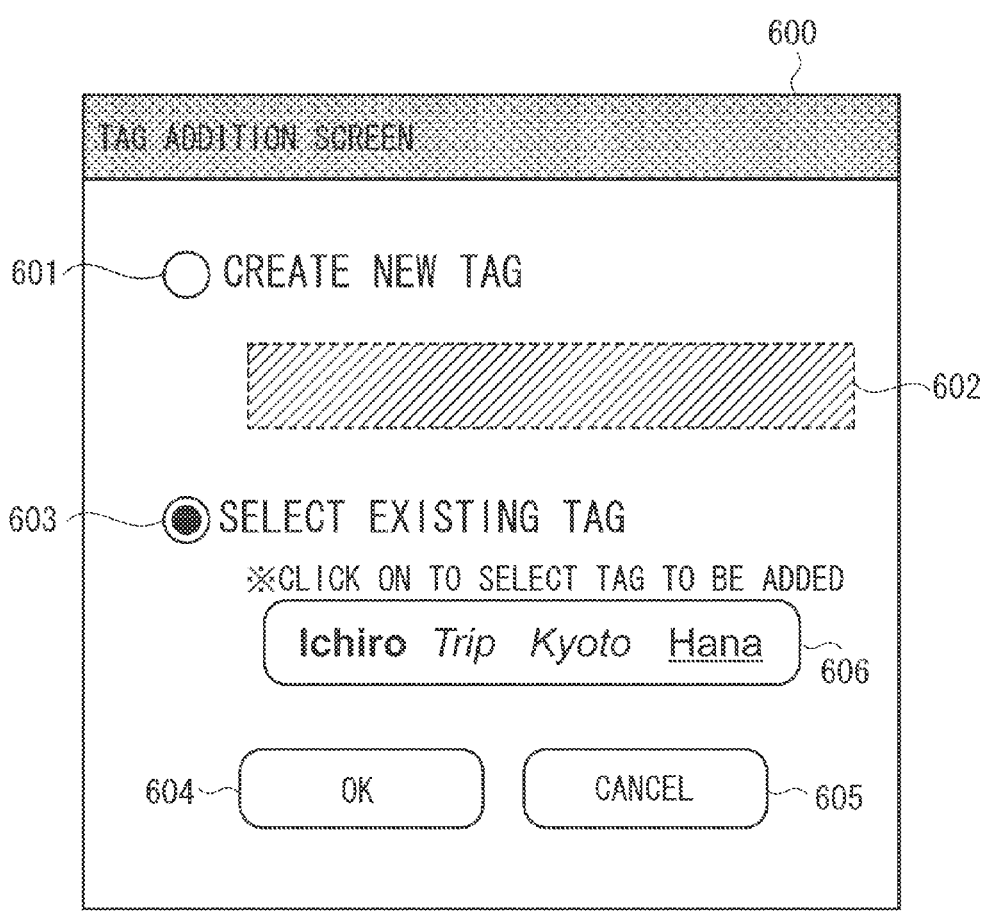

The control unit 101 displays the tag addition screen 600 including an existing tag list 606 such as illustrated in FIG. 6B on the display device 111. The existing tag list 606 includes tag names 232 added to all the image files 401 belonging to the predetermined folder. Each of the tag names 232 is displayed in different modes according to whether the tag name 232 has been added to the case (1) all the selected image files 401, the case (2) a part of the selected image files 401, or the case (3) none of the selected image files 401.

Accordingly, the user can easily recognize the addition statuses of the tags of the selected image files 401, so that a tag to be added to the selected image files 401 can be easily selected. For example, if a tag that the user wants to have added to all the selected image files 401 is displayed in the mode indicating the case (2), the user can easily recognize that there is still an image file or files to which the tag has not been added. Thus, the user can add such a tag to the remaining image file by simply designating the tag. The user can thus obtain a desired tag addition status by a simple operation.

According to the present exemplary embodiment, the addition statuses of the tags are identifiably displayed by changing character typefaces such that a tag name 232 of the case (1) is displayed in a bold type, a tag name 232 of the case (2) is displayed with an underline, and a tag name 232 of the case (3) is displayed in an italic type. However, the display modes of the tag names 232 are not limited thereto. Other display modes may be used as long as the addition statuses of the tags are identifiable. For example, the characters indicating the tag names 232 may be changed in color. Characters may be changed in size or may be framed. Icons may be displayed near the characters.

The control unit 101 may display a tag names 232 of the case (1) as being non-selectable and decline to accept selection of the tag. Accordingly, the user can avoid repeatedly selecting a tag that has already been added to all the selected image files 401, and reduce useless operations.

If the control unit 101 detects that a tag name 232 of the case (2) is moused over, the control unit 101 may display a thumbnail of an image file to which the tag is added in an identifiable manner on the image list screen 400. Accordingly, the user can recognize at a glance which image file the tag is added to.

In step S803, the control unit 101 detects that an existing tag is selected from the existing tag list. More specifically, if the control unit 101 detects in response to a user operation that at least one of the tag names 232 in the existing tag list 606 on the tag addition screen 600 is designated and the OK button 604 is pressed, then the control unit 101 detects that an existing tag is selected (YES in step S803).

In step S804, the control unit 101 acquires the tag ID of the existing tag selected in step S803 as the tag ID of the tag to be added to the selected image files 401.

Figure 11:
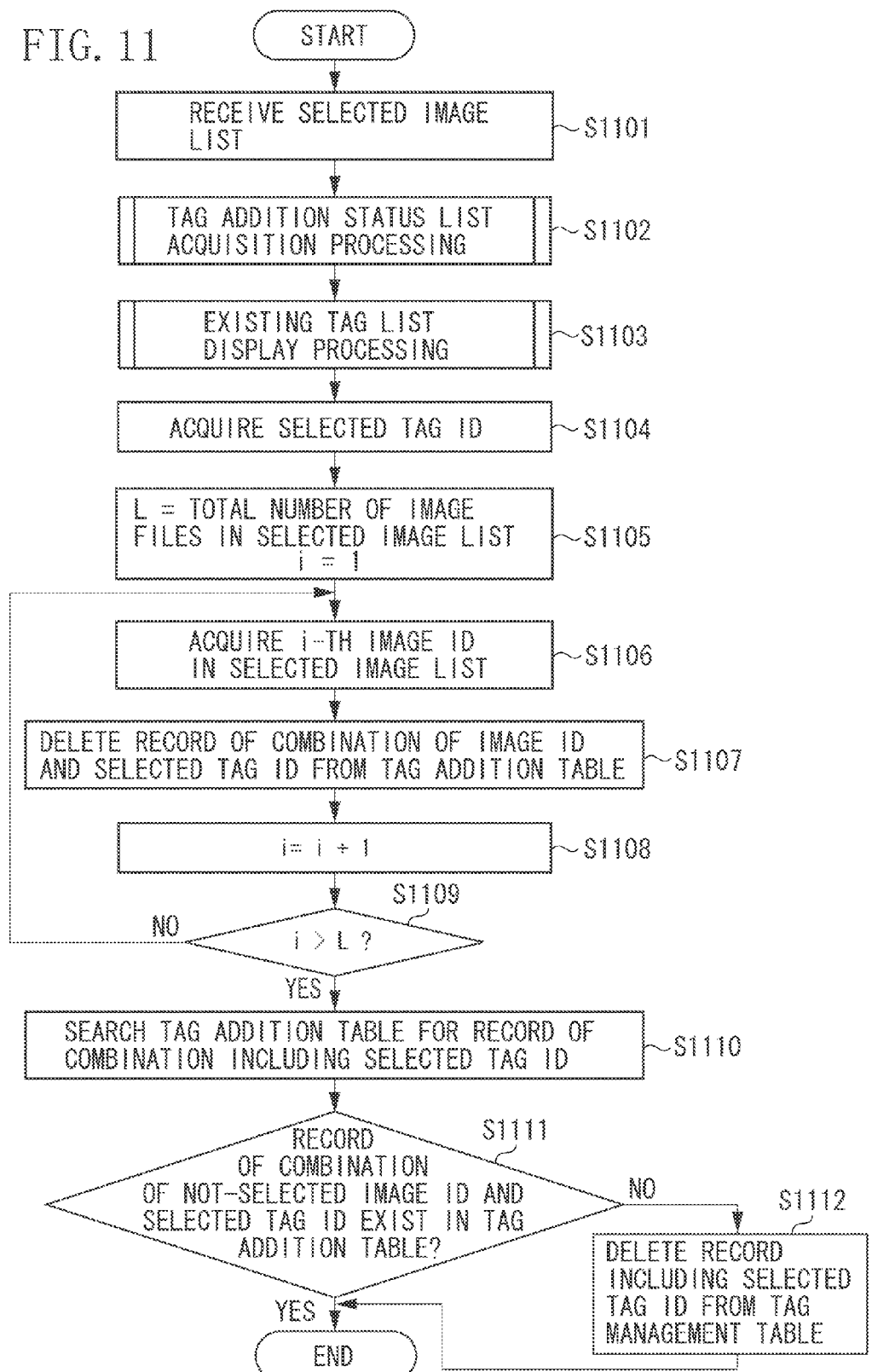
FIG. 11 is a flowchart illustrating an operation of the information processing apparatus according to the exemplary embodiment of the present invention.

The tag deletion processing in step S307 will be described with reference to a flowchart in FIG. 11.

In step S1101, the control unit 101 receives the selected image list created in step S303. In step S1102, the control unit 101 performs the tag addition status list acquisition processing illustrated in FIG. 9. In step S1103, the control unit 101 performs existing tag list display processing to be described below. In step S1104, the control unit 101 acquires a tag ID selected from the existing tag list.

In step S1105, the control unit 101 substitutes the total number of the image files 401 included in the selected image list received in step S1101, and substitutes one into a variable i for initialization. In step S1106, the control unit 101 acquires the i-th image ID in the selected image list. In step S1107, the control unit 101 searches the tag addition table 250 for a record of a combination of the tag ID acquired in step S1104 and the image ID acquired in step S1106, and deletes the record.

In step S1108, the control unit 101 adds one to the variable i. In step S1109, the control unit 101 compares the variable i with the variable L to determine whether the variable i is greater than the variable L. If the variable i is smaller than or equal to the variable L (NO in step S1109), the control unit 101 performs the processing in step S1106. On the other hand, if the variable i is greater than the variable L (YES in step S1109), the control unit 101 performs the processing in step S1110 since the tag has been deleted from all the image files 401 included in the selected image list.

In step S1110, the control unit 101 searches the tag addition table 250 for a record of a combination including the tag ID acquired in step S1104.

In step S1111, the control unit determines whether any record of a combination including the tag ID acquired in step S1104 is retrieved from the tag addition table 250. In other words, the control unit 101 determines whether a record of a combination including the image ID of an image file 401 which is not included in the selected image list and the tag ID acquired in step S1104 exists in the tag addition table 250.

If such a record does not exist (NO in step S1111), then in step S1112, the control unit 101 deletes the record including the tag ID acquired in step S1104 from the tag management table 230. Whereas, if such a record exists (YES in step S1111), the control unit 101 ends the present processing.

Figure 12:
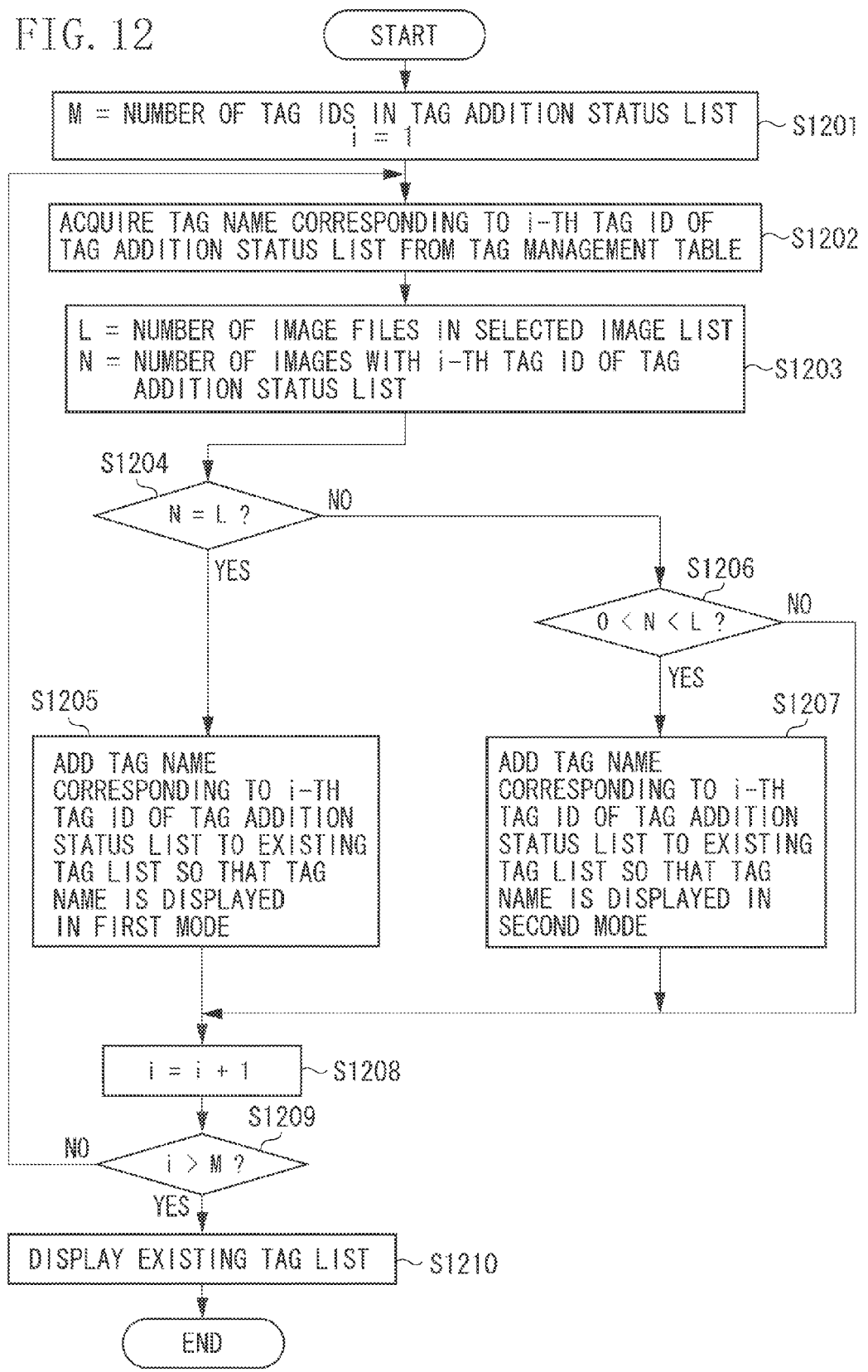
FIG. 12 is a flowchart illustrating an operation of the information processing apparatus according to the exemplary embodiment of the present invention.

The existing tag list display processing in step S1103 will be described with reference to a flowchart in FIG. 12.

In step S1201, the control unit 101 substitutes the number of the tag IDs included in the tag addition status list acquired in step S1102 into a variable M, and substitutes one into a variable i for initialization. In step S1202, the control unit 101 reads a tag name 232 corresponding to the i-th tag ID of the tag addition status list from the tag management table 230.

In step S1203, the control unit 101 substitutes the number of the image files 401 included in the selected image list received in step S1101 into a variable L, and substitutes the number of images with the i-th tag ID of the tag addition status list into a variable N.

In step S1204, the control unit 101 compares the variable N with the variable L to determine whether the variable N is equal to the variable L. If the variable N is equal to the variable L (YES in step S1204), then in step S1205, the control unit 101 adds the tag name 232 read in step S1202 to the existing tag list along with display control information for displaying the tag name 232 in the first mode, which indicates that the tag name 232 has been added to the case (1) all the selected image files 401.

If the variable N is not equal to the variable L (NO in step S1204), then in step S1206, the control unit 101 compares the variable N with the variable L to determine whether the variable N is greater than zero and smaller than the variable L. If the variable N is greater than zero and smaller than the variable L (YES in step S1206), then in step S1207, the control unit 101 adds the tag name 232 acquired in step S1202 to the existing tag list along with display control information for displaying the tag name 232 in the second mode, which indicates that the tag name 232 has been added to the case (2) a part of the selected image files 401.

If the variable N is not determined to be greater than zero and smaller than the variable L (NO in step S1206), the variable N is zero. Thus, the tag name 232 acquired in step S1202 will not be displayed since the tag name 232 has been added to none of the selected image files 401 and is not to be deleted. In such a case, the control unit 101 performs the processing in step S1208 without adding the tag name 232 acquired in step S1202 to the existing tag list. Alternatively, the control unit 101 may add the tag name 232 acquired in step S1202 to the existing tag list along with display control information for hiding the tag name 232.

In step S1208, the control unit 101 adds one to the variable i. In step S1209, the control unit 101 compares the variable i with the variable M to determine whether the variable i is greater than the variable M. If the variable i is smaller than or equal to the variable M (NO in step S1209), the control unit 101 performs the processing in step S1202. On the other hand, if the variable i is greater than the variable M (YES in step S1209), the control unit 101 performs the processing in step S1210 since all the tag names 232 included in the tag addition status list have been processed.

In step S1210, the control unit 101 refers to the existing tag list, and displays the tag names 232 on a tag deletion screen in display modes according to the display control information added to the respective tag names 232.

Figure 13:
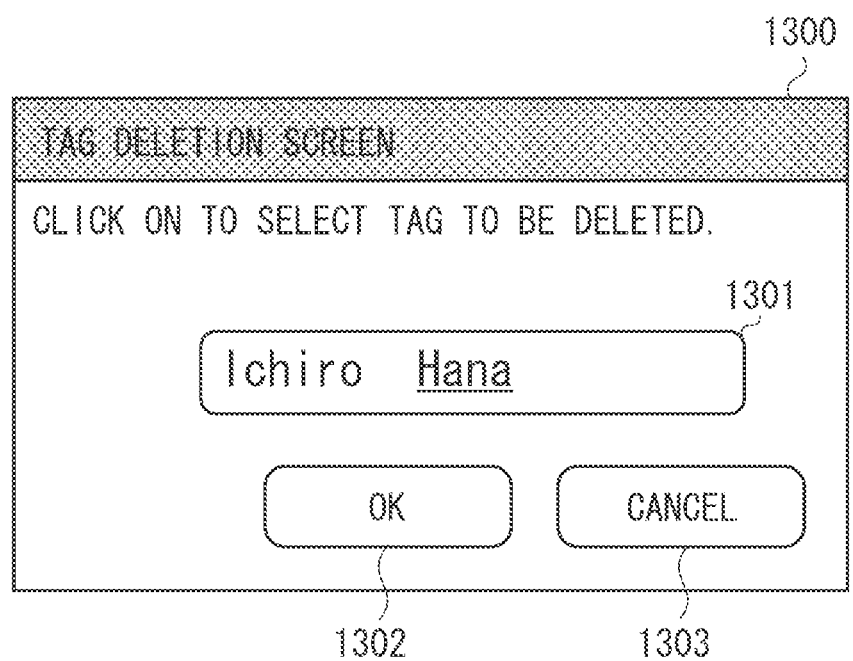
FIG. 13 is an example of a tag deletion screen according to the exemplary embodiment of the present invention.

The control unit 101 displays a tag deletion screen 1300 including an existing tag list 1301 such as illustrated in FIG. 13 on the display device 111. The existing tag list 1301 includes tag names 232 added to the selected image files 401. Each of the tag names 232 is displayed in different modes according to whether the tag name 232 has been added to the case (1) all the selected image files 401 or the case (2) a part of the selected image files 401. Accordingly, the user can easily recognize the addition status of the tag information on the selected image files 401, so that a tag to be deleted from the selected image files 401 can be easily selected. If a tag name 232 has been added to the case (3) none of the selected image files 401, its tag information is not displayed. Thus, the user can avoid uselessly selecting tag information that is not to be deleted as far as the selected image files 401 are concerned. The display modes may be implemented by using a similar method to that for the existing tag list 606 on the tag addition screen 600 in FIG. 6B. Various display modes may be used as appropriate.

The present exemplary embodiment deals with the case of adding a tag to an image file. However, a target to which a tag is added to may be another content files such as a music file or a document file instead of an image file.

According to the present exemplary embodiment, the tag addition screen 600 and the tag deletion screen 1300 are displayed independent of the image list screen 400. However, such screens may be displayed on an identical screen.

Figure 9:
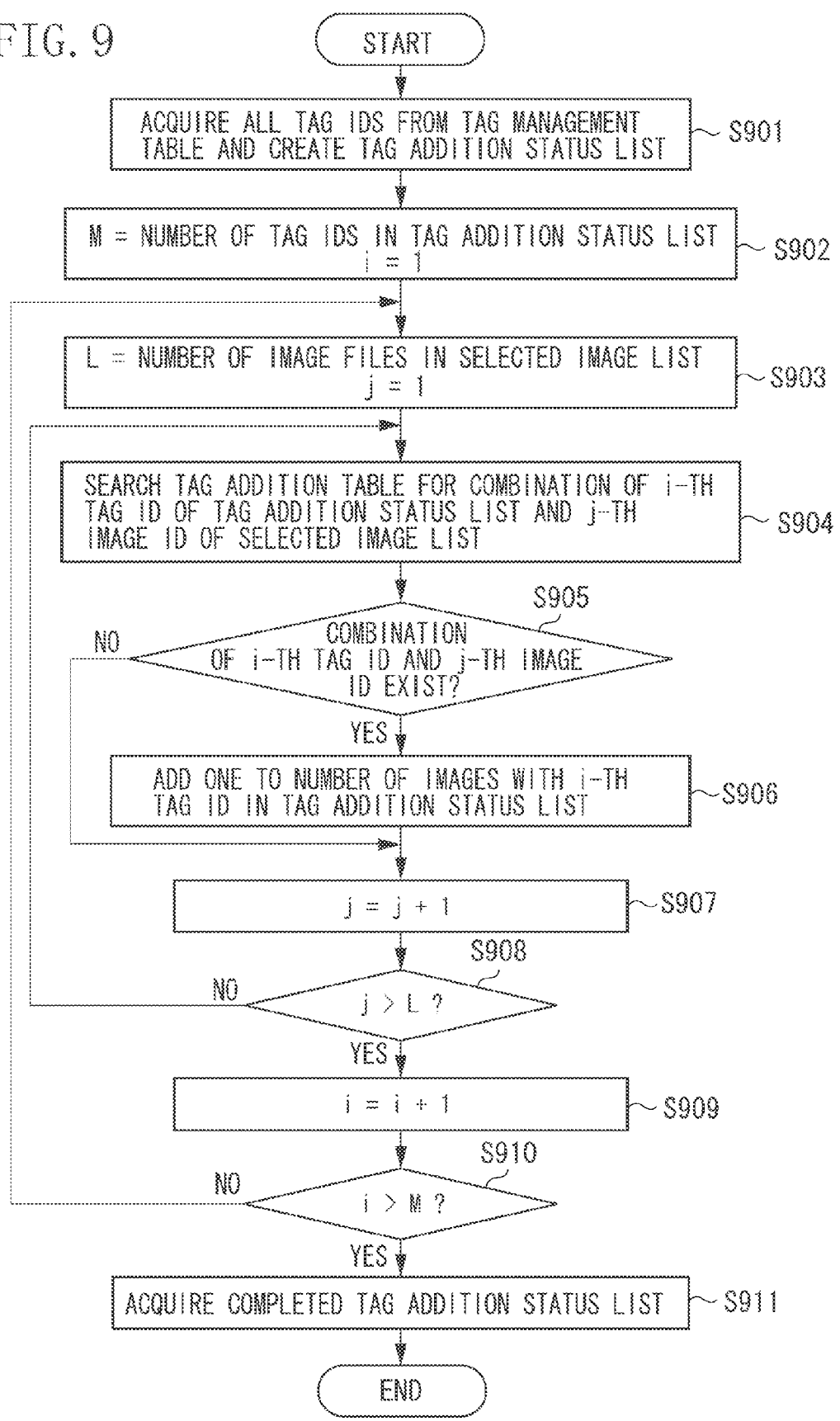
FIG. 9 is a flowchart illustrating an operation of the information processing apparatus according to the exemplary embodiment of the present invention.

In the tag addition status acquisition processing according to the present exemplary embodiment, as illustrated in FIG. 9, the control unit 101 counts the number of the image files 401 to which each piece of tag information has been added among the selected image files 401. The control unit 101 then compares the total number of the selected image files 401 with the counted number of the image files 401, and acquires the addition status of the tag information according to the comparison result. Consequently, in a case where the tag information has been added to the case (2) a part of the selected image files 401, the control unit 101 can also acquire information about how many of the image files 401 the tag information has been added to, how many of the image files 401 the tag information has not been added to, and which image files 401 the tag information has not been added to. This allows the control unit 101 to make a detailed notification.

If the information processing apparatus according to the present exemplary embodiment includes a plurality of computer apparatuses, a first computer apparatus uploads image files to a second computer apparatus via the Internet, and stores the image files into a storage device 104 of the second computer apparatus. The second computer apparatus transmits a list of the image files stored in the storage device 104 to the first computer apparatus, and displays the list of the image files on a display device 111 of the first computer apparatus. The first computer apparatus selects desired image files from the displayed list of the image files, and transmits unique information about the selected image files to the second computer apparatus. The second computer apparatus acquires the image files stored in the storage device 104 and tags added to the image files selected by the first computer apparatus, and generates tag display data for displaying the tags in modes according to addition statuses. The second computer apparatus transmits the tag display data to the first computer apparatus, and displays the tag display data on the display device 111 of the first computer apparatus.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-010265 filed Jan. 20, 2012, which is hereby incorporated by reference herein in its entirety.

What is claimed is:

1. An information processing apparatus comprising:
a storing unit configured to store a plurality of pieces of tag information which are associated with content files;
a selection unit configured to select at least one of the content files;
a counting unit configured to count the number of the selected content files which are associated with each piece of the tag information stored by the storing unit;
a display control unit configured to display each piece of the tag information in different display modes whether the number of the selected content files associated with the piece of the tag information indicates all of the selected content files, some of the selected content files, or none of the selected content files;
a designation unit configured to designate at least one of the pieces of the displayed tag information; and
a tag deletion unit configured to delete an association between the designated piece of the tag information and the selected content files to which the designated piece of the tag information is added,
wherein the information processing apparatus comprises a processor executing a program stored in a memory to implement at least a part of a function of at least one of the units.

2. The information processing apparatus according to claim 1, further comprising:
a tag addition unit configured to store the designated piece of the tag information in association with the selected content files.

3. The information processing apparatus according to claim 1, wherein the display control unit displays the piece of tag information in a display mode indicating non-selectability according to the number of the selected content files associated with the piece of tag information.

4. The information processing apparatus according to claim 1, wherein the display control unit displays the piece of tag information with use of different character typefaces, character colors, character sizes, character decoration, and icons according to the number of the selected content files associated with each piece of the tag information.

5. The information processing apparatus according to claim 1, further comprising:
a designation unit configured to designate at least one of the plurality of pieces of the tag information in response to a predetermined operation; and
a content display unit configured to identifiably display a content file to which the designated piece of the tag information is added.

6. A method for controlling an information processing apparatus, the method comprising:
storing, using a processor, a plurality of pieces of tag information which are associated with content files;
selecting, using the processor, at least one of the content files;
counting, using the processor, the number of the selected content files which are associated with each piece of the tag information stored by the storing unit;
displaying each piece of the tag information in different display modes whether the number of the selected content files associated with the piece of the tag information indicates all of the selected content files, some of the selected content files, or none of the selected content files;
designating at least one of the pieces of the displayed tag information; and
deleting an association between the designated piece of the tag information and the selected content files to which the designated piece of the tag information is added.

7. A non-transitory computer-readable storage medium storing a program for causing a computer to perform:
storing, using a processor, a plurality of pieces of tag information which are associated with content files;
selecting, using the processor, at least one of the content files;
counting, using the processor, the number of the selected content files which are associated with each piece of the tag information stored by the storing unit;
displaying each piece of the tag information in different display modes whether the number of the selected content files associated with the piece of the tag information indicates all of the selected content files, some of the selected content files, or none of the selected content files;
designating at least one of the pieces of the displayed tag information; and
deleting an association between the designated piece of the tag information and the selected content files to which the designated piece of the tag information is added.

* * * * *